United States Patent
Kohareswaran et al.

(10) Patent No.: US 11,113,717 B2
(45) Date of Patent: Sep. 7, 2021

(54) CUSTOMER ENGAGEMENT PLATFORM EXPERIMENTATION FRAMEWORK

(71) Applicant: MICROSOFT TECHNOLOGY LICENSING, LLC, Redmond, WA (US)

(72) Inventors: Naganandhini Kohareswaran, Redmond, WA (US); Ling-Ya Huang, Bellevue, WA (US); Einat Hazan, Lynnwood, WA (US); Harish Jayanti, Redmond, WA (US); Keith Robert Kinnan, Sammamish, WA (US); Jayaram N. M. Nanduri, Issaquah, WA (US); Jagannatha Raju Dantuluri, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 824 days.

(21) Appl. No.: 15/599,968

(22) Filed: May 19, 2017

(65) Prior Publication Data

US 2018/0336588 A1 Nov. 22, 2018

(51) Int. Cl.
*G06Q 30/02* (2012.01)

(52) U.S. Cl.
CPC ..... *G06Q 30/0244* (2013.01); *G06Q 30/0243* (2013.01); *G06Q 30/0255* (2013.01)

(58) Field of Classification Search
CPC ........... G06Q 30/0244; G06Q 30/0255; G06Q 30/0243
See application file for complete search history.

(56) References Cited

U.S. PATENT DOCUMENTS

| 6,708,155 B1* | 3/2004 | Honarvar ............. G06Q 10/063 705/7.36 |
| 2007/0038516 A1 | 2/2007 | Apple et al. |
| 2008/0046267 A1 | 2/2008 | Romano et al. |
| 2009/0012867 A1 | 1/2009 | Lerman et al. |
| 2009/0024463 A1 | 1/2009 | Szeto |

(Continued)

OTHER PUBLICATIONS

Pini Yakuel, How to Treat Every Customer Campaign as a Marketing Experiment, Published on Apr. 17, 2013. (Year: 2013).*

(Continued)

*Primary Examiner* — Nadja N Chong Cruz
(74) *Attorney, Agent, or Firm* — Shook, Hardy & Bacon LLP (57) ABSTRACT

Systems and methods provide a customer engagement platform experimentation framework. Experiments are created to determine which variation of a particular promotion (i.e., an experiment) is most effective. Initially, users are split into buckets that define whether a particular user is in a control group or a treatment group for a particular experiment. Users are assigned into buckets differently for unrelated experiments and similarly for related experiments. This ensures the users are in either the control group or the treatment group for all related experiments. Key performance indicators (KPIs) of users that experienced the experiment are compared with KPIs of users that did not experience the experiment. An assessment of the experiment can then be provided based on the compared KPIs.

18 Claims, 6 Drawing Sheets

(56) References Cited

U.S. PATENT DOCUMENTS

| | | |
|---|---|---|
| 2009/0171763 A1 | 7/2009 | Dong et al. |
| 2011/0258039 A1 | 10/2011 | Patwa et al. |
| 2012/0030007 A1 | 2/2012 | Ye |
| 2012/0166282 A1 | 6/2012 | Reis et al. |
| 2013/0066706 A1 | 3/2013 | Wu et al. |
| 2014/0330633 A1* | 11/2014 | Moran .............. G06Q 30/0244 705/14.43 |

OTHER PUBLICATIONS

Xu et al., From Infrastructure to Culture: A/B Testing Challenges in Large Scale Social Networks, KDD '15, Aug. 11-14, 2015. (Year: 2015).*

* cited by examiner

CUSTOMER ENGAGEMENT PLATFORM EXPERIMENTATION FRAMEWORK

BACKGROUND

Organizations are constantly seeking to engage more users by providing appropriate experiences and services to engaged and invested users. To engage the users, promotions tailored specifically for each user can be based on past activities, demographics, and the like. These promotions must be chosen appropriately so the users find them useful and engaging. To match promotions accurately to the users, several factors are considered: 1) is a given promotion applicable and interesting to the user; 2) is it the correct promotion for a given user; and 3) is the promotion text or image most appropriate for the user. Each of these factors, as well as others not mentioned, can be utilized to tweak the promotion so the promotion is tailored more accurately for the user.

These organizations often provide variations of promotions (e.g., experiments) to identify the most effective promotion. This may be determined by assessing key performance indicators (KPIs) for the promotion (e.g., interactions with the promotion, click through rate, etc.). Unfortunately, current platforms for providing experimentation with promotions (e.g., variations of available promotions to determine which is most effective for a particular user or a user having a particular set of past activities, demographics, and the like) are deficient in a number of respects.

Current platforms typically operate by splitting incoming traffic into available experiments. However, these platforms suffer from the inability to incrementally expose an audience to an experiment. This may lead to user fatigue because some users may be provided the experiment too many times for it to be effectively measured. More importantly, this may lead to muddling of the experiment results because user may have experienced the experiment in one session but may be part of the control group in another session. Other users that should be provided the experiment a particular number of times, may not be provided the experiment enough for it to be effectively measured. Additionally, these platforms do not allow multiple experiments to be run in parallel, limiting the users to just one experiment.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein provides a customer engagement platform experimentation framework. Experiments are created to determine which variation of a particular promotion (i.e., an experiment) is most effective. Initially, users are split into buckets that define whether a particular user is in a control group or a treatment group for a particular experiment. Users are assigned into buckets differently for unrelated experiments and similarly for related experiments. This ensures the users are in either the control group or the treatment group for all related experiments. Key performance indicators (KPIs) of users that experienced the experiment are compared with KPIs of users that did not experience the experiment. An assessment of the experiment can then be provided based on the compared KPIs.

BRIEF DESCRIPTION OF THE DRAWINGS

The present invention is described in detail below with reference to the attached drawing figures, wherein.

DETAILED DESCRIPTION

The technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

"Numberlines" as utilized herein are used to hash users into buckets to group them and are explained in greater detail below. A numberline consists of a seed and a start bucket. Each campaign is assigned to a numberline.

"Control groups" are an omitted set of buckets of users, as per the size of the control group, in all campaigns associated with a given numberline. This enables the ability to assess whether the campaign has a better impact on the KPIs as compared to organic changes in KPIs. This can be accomplished by comparing the KPIs of users that have experienced the campaign with KPIs of users that have not experienced the campaign. When a new campaign object (i.e., the experiment) is created, it will be assigned to a numberline with a default control group size that can later be configured by the user.

A "promotional unit" or "PU" is the smallest unit of a promotion that is addressable by an experiment. This defines things such as who, where, what, when, etc. for the promotion.

An "exposure percentage" is the percentage of users that an organization desires to show an experiment to, within the target audience. When a new campaign is introduced to a market, the marketers might choose to only show it to a percentage of users initially, to assess the feedback, and then choose to ramp up or ramp down the number of users to participate in the campaign.

A "treatment" refers to each variation of a parameter (of the original promotion unit) a user wants to test. Each experiment can vary exactly one parameter within the original promotion unit. The type of the parameter varied defines the type of the experiment (e.g., creative A/B or segment A/B). An experiment can test more than one value for this variant (e.g., testing creatives A, B and C). Each variation of a parameter the user wants to test defines a treatment.

A "treatment exposure percentage" is the percentage of users that experiences the variant value of the experiment within the scope defined by the static promotional unit parameters. For example, a creative experiment can test creative A with twenty-five percent of the users, creative B with twenty-five percent of the users, and the rest of the users can experience the default creative C. All other parameters remain the same for all the users.

"Experiment promotional units" are the segments created from the original promotional unit based on the treatment group definitions and its exposure percentage. For example, assume there is an original promotional unit with what defined as Creative C by default, who defined as a particular segment of users (e.g., segment1), and where defined as Windows Lock Screen. If an experiment is setup on this promotional unit with creative A set to twenty-five percent of the users and creative B set to twenty-five percent of the users, then the original promotional unit will be converted into the following 3 different experiment promotional units: 1) Creative C, Segment1, Lock, 0-50% flight (Default); 2) Creative A, Segment1, Lock, 50-75% flight; and 3) Creative B, Segment1, Lock, 75-100% flight.

As noted in the Background, organizations are constantly seeking to engage more users by providing appropriate experiences and services to engaged and invested users. To engage the users, promotions tailored specifically for each user can be based on past activities, demographics, and the like. These promotions must be chosen appropriately so the users find them useful and engaging. To match promotions accurately to the users, several factors are considered: 1) is a given promotion applicable and interesting to the user; 2) is it the correct promotion for a given user; and 3) is the promotion text or image most appropriate for the user. Each of these factors, as well as others not mentioned, can be utilized to tweak the promotion so the promotion is tailored more accurately for the user.

These organizations often provide variations of promotions (e.g., experiments) to identify the most effective promotion. This may be determined by assessing KPIs for the promotion (e.g., interactions with the promotion, click through rate, etc.). Unfortunately, current platforms for providing experimentation with promotions (e.g., variations of available promotions to determine which is most effective for a particular user or a user having a particular set of past activities, demographics, and the like) are deficient in a number of respects.

Current platforms typically operate by splitting incoming traffic into available experiments. However, these platforms suffer from the inability to incrementally expose an audience to an experiment. This may lead to user fatigue because some users may be provided the experiment too many times for it to be effectively measured. More importantly, this may lead to muddling of the experiment results because a user may have experienced the experiment in one session but may be part of the control group in another session. Other users that should be provided the experiment a particular number of times, may not be provided the experiment enough for it to be effectively measured. Additionally, these platforms do not allow multiple experiments to be run in parallel, limiting the users to just one experiment.

The technology described herein solves the user problem of reducing user fatigue and latency by providing a customer engagement platform experimentation framework. Experiments are created to determine which variation of a particular promotion (i.e., an experiment) is most effective. Initially, users are split into buckets that define whether a particular user is in a control group or a treatment group for a particular experiment. Users are assigned into buckets differently for unrelated experiments and similarly for related experiments. This ensures the users are in either the control group or the treatment group for all related experiments. Key performance indicators (KPIs) of users that experienced the experiment are compared with KPIs of users that did not experience the experiment. An assessment of the experiment can then be provided based on the compared KPIs.

In embodiments, the framework provides continuous assessments and adjustments to increase accuracy of the system. If multiple promotions have related goals, the framework allows a reduction of impact of one campaign over others. In some embodiments, the framework has business logic to orchestrate multiple experiments at the same time by using a different set of users for each combination of the variations so the results for each combination can be measured independently.

Additionally, or alternatively, a combination of parameters can be tested on a smaller subset of users and, based on the assessment, the experiment can be provided to more or less users. The experiment can be ramped up or down at a specific experiments treatment level or at the booking line level (which may define the market, creative, surface, user segment, session variables, etc.). In other words, the experiment can be variable and configurable.

For example, Creative A/B allows a specified percentage of users to be shown different creative content. This type of experiment can be ramped up/ramped down based on how the creative performs vs another creative. In another example, Segment A/B allows a specified or defined set of users (segment/audience) to be shown certain content. This enables the experiment to compare different segment definitions and figure out which is most effective for the same content. Both Creative A/B and Segment A/B experiments can be booked with comparison where the insight KPIs can be measured and based on KPI/success criteria, a creative or a segment can be chosen as better than another. That creative or segment can then be fully ramped up to one hundred percent for that particular experiment.

Other configuration parameters on an experiment or campaign can also be used to filter the set of users or reduce the users for the initial experiment. The experiment can then be ramped up or down based on the results. For example, the market can in a particular language, in a particular country (e.g., English/USA, French/France). The experiments can be run in a particular market to reduce the number of initial users, and can eventually be ramped up to include the entire global population or the experiment may not be fully rolled out at all.

In another example, the surface (i.e., the place where the content is displayed) may be used to filter the set of users or reduce the users for the initial experiment. For example, a surface could be WINDOWS lock screen or store banner or any other software surface where a user is provided content. In some embodiments, content can be booked across multiple surfaces, or the content can be booked on an initial surface before expanding to other surfaces.

In another example, variables, such as runtime parameters or filters may be used to filter the set of users or reduce the users for the initial experiment. For example, users may initially be targeted based on parameters detected at runtime during a client content request. A user may be in a segment and be eligible to be shown content through a campaign/experiment, however session parameters (e.g., operating system version or screen resolution) may be specified so the content is only provided when these runtime parameters are satisfied. As expressed with the other examples, the experiment may be ramped up or down based on the results (e.g., to include other versions of operating systems).

If more than one of the parameters is varied, an assessment for each combination of all the parameters can be provided. The framework is also scalable to support optimizing many experiments in parallel. The use of numberlines allows different sets of users to be part of the experiment in each campaign. Numberlines also allows for similar or related campaigns to choose to use the same control group for experiments so that control users do not get biased by other related campaigns.

In practice, an experiment is initially setup or edited. To do so, a user may select the size of a control group, aspects of the promotional unit (e.g., the who, where, what, when, etc. of the experiment), the exposure percentage, a parameter of the promotional unit being varied (if applicable), and a treatment exposure percentage. The framework stores and manages the experiment and numberline metadata and computes the user bucket assignments for the experiment.

Next, the framework creates the experiment line bookings according to the numberlines and selections made by the user and passes them along for delivery to the user. At this point, the experiment is ready to be delivered to the user in accordance with the experiment line bookings and any other conditions added to the experiment.

Finally, metadata received from the framework as well as telemetry from various sources can be leveraged to compute KPIs. Reports for assessing the result of the experiment can be built and provided to a campaign creator.

For example, in a creative A/B scenario, a campaign creator may run a campaign on a particular browser (e.g., EDGE) for a new application. The campaign creator has several options for creatives and wants to find the creative that performs best. The campaign creator uses the framework to upload the creatives and configure a campaign. When creating the campaign, each creative is specified to be a part of an experiment promotional unit with a selected treatment exposure percentage. The framework creates and configures the experiment for the campaign. Through the assessments, the campaign creator and/or a software process can determine how each experiment promotional unit is performing. The person or software process can then increase or decrease the treatment exposure percentage based on the performance of the creative in each experiment promotional unit.

In another example, a data scientist builds new machine learning models for a segment of users targeted in a campaign and wants to evaluate if the users identified by the machine learning models are engaging better than the manually created segment of users. A campaign creator uses the framework to set up an experiment and configure a campaign. Each segment is configured to be a part of an experiment promotional unit with a selected treatment exposure percentage. The framework creates and configures the experiment for the campaign. Through the assessments, the campaign creator and/or software process can determine how each segment is performing. The person or software process can then increase or decrease the treatment exposure percentage based on the performance of the segment in each experiment promotional unit.

Accordingly, one embodiment of the present disclosure is directed to a method of creating a customer engagement platform experimentation framework. The method includes creating, based on selections made by a campaign creator at a user interface, an experiment based on an original promotion to determine customer engagement. The experiment includes conditions selected by the user. The method also includes computing user bucket assignments for the experiment. The user bucket assignments group the users of the experiment into a control or a treatment group. The method further includes creating experiment bookings for the experiment in accordance with the bucket assignments. The method also includes delivering the experiment to user clients in accordance with the conditions and the experiment bookings.

In another embodiment, the present disclosure is directed to a computer-readable storage medium comprising computer-executable instructions that, when executed by a computer, causes the computer to perform operations to facilitate creating a customer engagement platform experimentation framework. The operations include creating, based on selections made by a user at a user interface, an experiment based on an original promotion to determine customer engagement. The experiment includes conditions selected by the user. The operations also include, utilizing numberlines, computing user bucket assignments for the experiment that group the users of the experiment into a control or a treatment group. The numberlines compute the user bucket assignments differently for unrelated experiments and similarly for related experiments to ensure the users are in either the control or the treatment group for all the related experiments. The operations further include comparing key performance indicators (KPIs) of users that experienced the experiment with KPIs of users that did not experience the experiment. The operations also include providing an assessment of the experiment based on the compared KPIs.

In yet another embodiment, the present disclosure is directed to a computerized system for providing a customer engagement platform experimentation framework. The system includes a processor and a computer storage medium storing computer-useable instructions that, when used by the processor, cause the processor to: enable setup and management of experiments to determine customer engagement, the setup and management including conditions; store and manage the experiments and numberline metadata; compute user bucket assignments for each experiment of the experiments in accordance with the numberline metadata; create experiment bookings for each experiment of the experiments in accordance with the bucket assignments; and deliver the experiment to user clients in accordance with the conditions and the experiment bookings.

Figure 1:
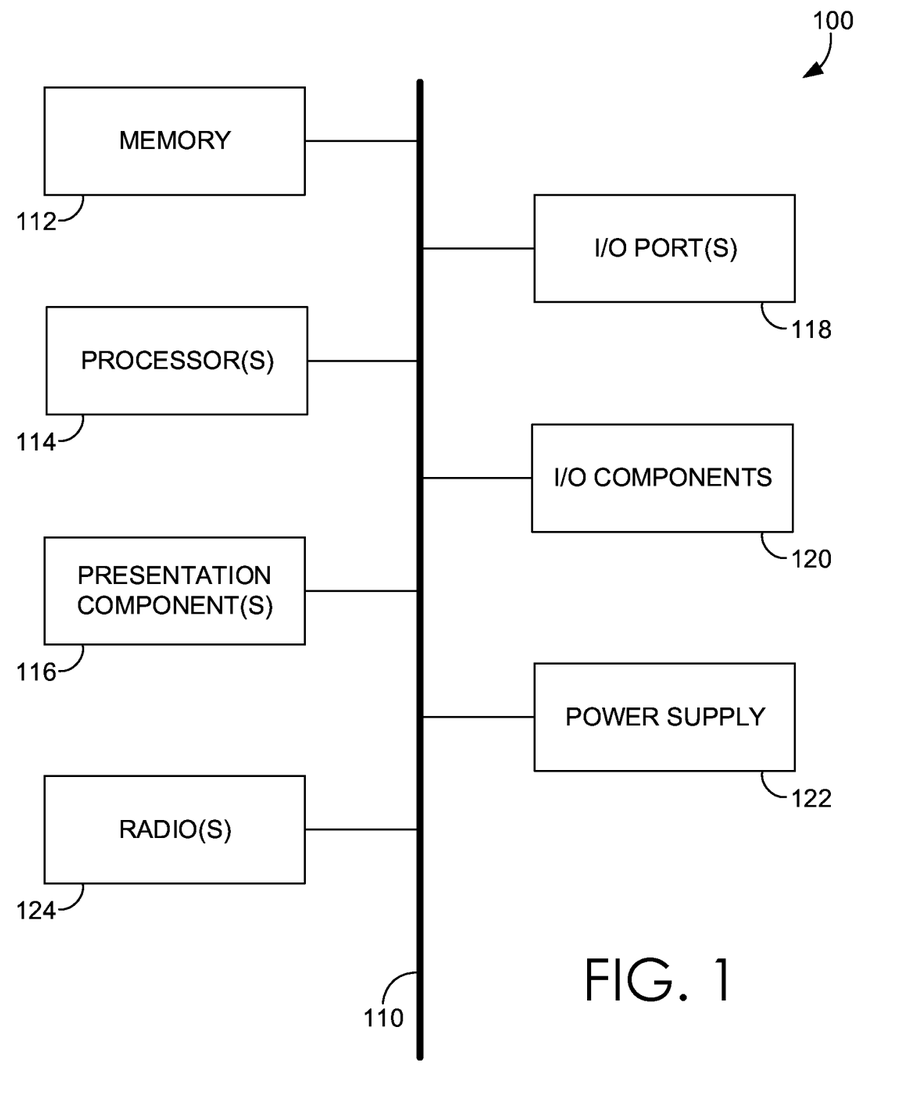
FIG. 1 is a schematic showing an exemplary computing environment suitable for use with the technology described herein.

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Exemplary Customer Engagement Platform Experimentation Framework

Figure 2:
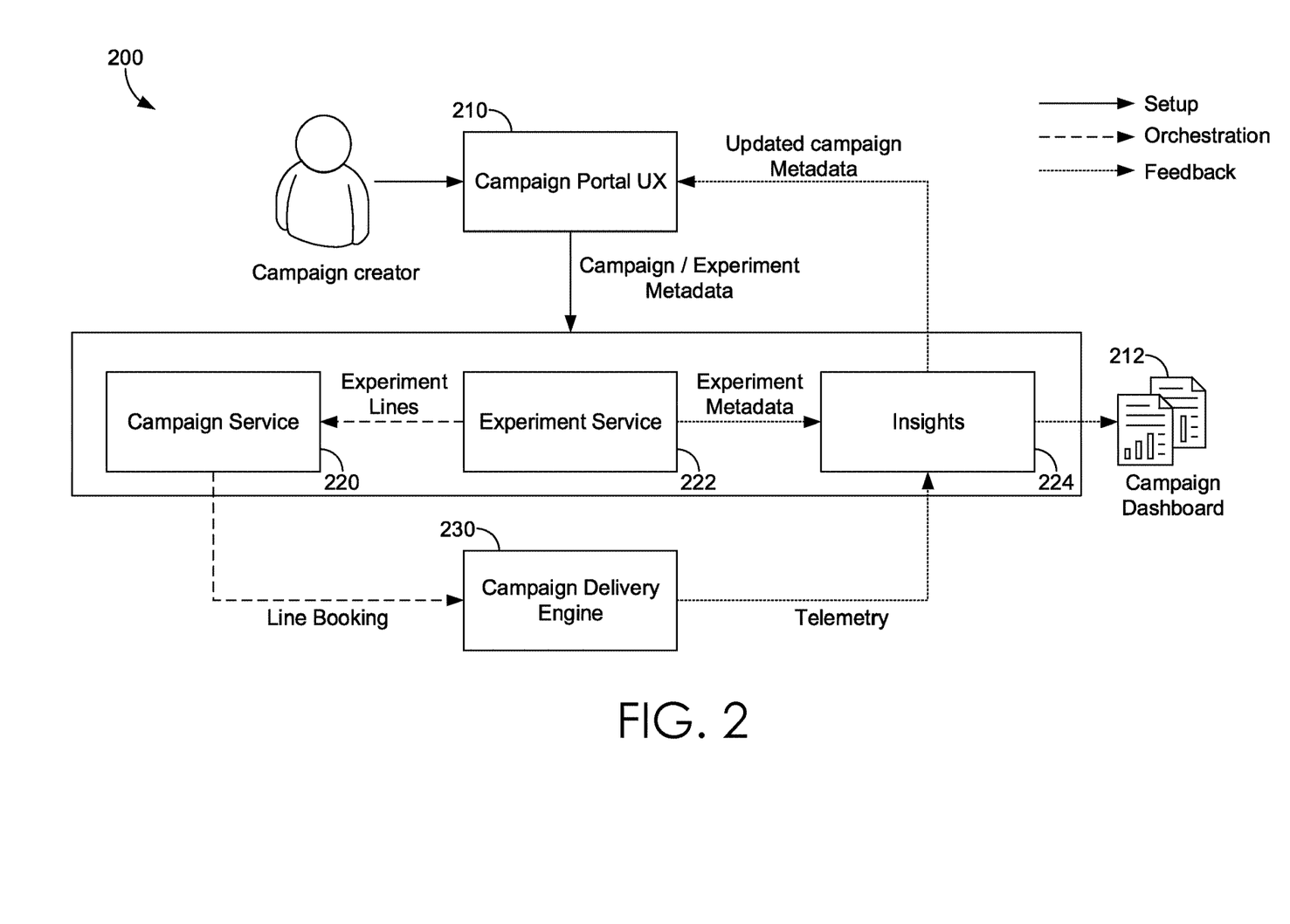
FIG. 2 is a block diagram showing am exemplary customer engagement platform experimentation framework, in accordance with aspects of the technology described herein.

Turning now to FIG. 2, a customer engagement platform experimentation framework 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The customer engagement platform experimentation framework 200 may be implemented via any type of computing device, such as computing device 100 described above with reference to FIG. 1, for example.

The customer engagement platform experimentation framework 200 generally operates to help determine which variation of a particular promotion (i.e., an experiment) is most effective. As shown in FIG. 2, the customer engagement platform experimentation framework 200 includes, among other components not shown, campaign portal 210, campaign dashboard 212, campaign service 220, experiment service 222, insights service 224, and campaign delivery engine 230. It should be understood that the customer engagement platform experimentation framework 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of campaign portals, campaign services, experiment services, insights services, campaign delivery engines, and campaign dashboards may be employed within the customer engagement platform experimentation framework 200 within the scope of the present disclosure. Each may comprise a single device or multiple devices cooperating in a distributed environment. For instance, the campaign service 220, the experiment service 222, the insights service 224, or the campaign delivery engine 230 may be provided via multiple devices arranged in a distributed environment that collectively provide the functionality described herein. In other embodiments, a single device may provide the functionality of multiple components of customer engagement platform experimentation framework 200. For example, a single device may provide the campaign service 220, the experiment service 222, and the insights service 224. In some embodiments, some or all functionality provided by campaign portal 210 and/or campaign dashboard 212 (or other components) may be provided by a user device. Additionally, other components not shown may also be included within the network environment.

The customer engagement platform experimentation framework 200 initially provides a campaign portal 210. Generally, the campaign portal 210 enables a user to create, edit, or manage an experiment. For example, the user may select an experiment, a ramp percentage, a control size group, and the like. This information selected by the user is represented by campaign or experiment metadata.

The experiment service 222 generally stores and manages the experiment metadata and numberline metadata and computes the user bucket assignments for each experiment. As stated above, numberlines are used to hash users into buckets to group them. Numberlines hash users differently for unrelated campaigns. For similar or related campaigns, numberlines ensure that users are hashed to the same buckets and are in either the control or the treatment group for all campaigns that are using the same numberline. For example, if two campaigns are using the same numberline, then implicitly the two campaigns also have the same size control group. This ensures that a user is deterministically in either the control or treatment group for all the campaigns in that number line. However, the campaigns can still have different flight percentages for the various segments within the treatment group. Additionally, the flight percentages can be changed without changing the experience of users already in the control or treatment buckets.

The campaign delivery engine 230 utilizes a hash function that randomly distributes users across a given number of buckets. Users are evenly distributed across a given number of buckets. The bucket number computed by the hash function is consistent for any given seed and user identification. Each campaign is assigned a numberline.

When a campaign is booked for a certain market, surface, user segment, session variables, etc., depending on the experiment related settings for it (e.g., ramp percentage, control group size, experiment treatment size, etc.), the experiment service 222 computes the buckets of users who are eligible for that campaign.

By way of example, if a campaign is supposed to have a control group size of twenty percent, then the first twenty percent of the buckets (e.g., assuming there are 1000 buckets, the first twenty percent are buckets 1-200) is designated as the control group. The remaining eighty percent of the buckets (e.g., assuming the same 1000 buckets, the remaining eighty percent are buckets 201-1000) is designated as the treatment group. The ramp percentage for the promotion and/or the experiment's treatment size is then applied on top of the treatment buckets (201-1000). For example, if the ramp percentage of a particular market is set to fifty percent, then fifty percent of the treatment range (i.e., buckets 201-600) is designated as the eligible user buckets for that market.

At runtime, a user identification in the request is hashed with the seed for that campaign and the bucket is computed and compared with the list of eligible buckets. If the user's bucket falls within the eligible buckets list, the campaign is delivered to the user's client device. Given that the hash calculation is performed at runtime before deciding which promotion to show to the user, there is a limit on how many different seeds can be hashed for a given user identification.

To still allow many experiments across different campaigns to run in parallel the framework also uses a concept called a start bucket. In the above example, since the control and treatment bucket assignments started at bucket 1, the start bucket is 1. To increase the variations in user distribution, this start bucket can be varied for different campaigns.

For example, another campaign may have the same seed with a start bucket set to 100. In that case, the control group will be buckets 100-300 and the treatment group will be buckets 301-1000 and 1-99. In this way, even though the two campaigns have the same seed assigned to them, the set of users in the control group and treatment group of the two campaigns are different.

After the user bucket assignments have been created for each experiment by the experiment service 222, the experiment service 222 communicates the experiment lines or numberline metadata to the campaign service 220. The campaign service 220 creates the experiment line bookings according to the numberline metadata (e.g., seed and start number) from the experiment service 222. The experiment line bookings are communicated to the campaign delivery engine 230.

Upon receiving the experiment line bookings, the campaign delivery engine 230 respects any conditions (e.g., experiment metadata) added to the experiment lines. Any experiments can then be delivered to user clients accordingly.

Metadata received from any of the services (e.g., campaign portal 210, campaign service 220, experiment service 222) or telemetry received from the campaign delivery engine 230 are provided to the insights service 224. For example, information corresponding to the promotional units, parameters, or any items selected by a user creating, editing, or managing the experiment is communicated by the services to the insights service 224. Additionally, or alternatively, telemetry such as interactions with an experiment or click-through data is also communicated to the insights service 224. The insights service utilizes this information to compute the KPIs and build a report that assesses the results of the experiments. In some embodiments, the insights service communicates the reports to the campaign dashboard 212. In other embodiments, the insights services 224 utilizes the assessments to update campaign metadata directly at the campaign portal 210. These updates may be applied automatically to update an experiment or prompt a user to verify the updates prior to updating the experiment.

Figure 3:
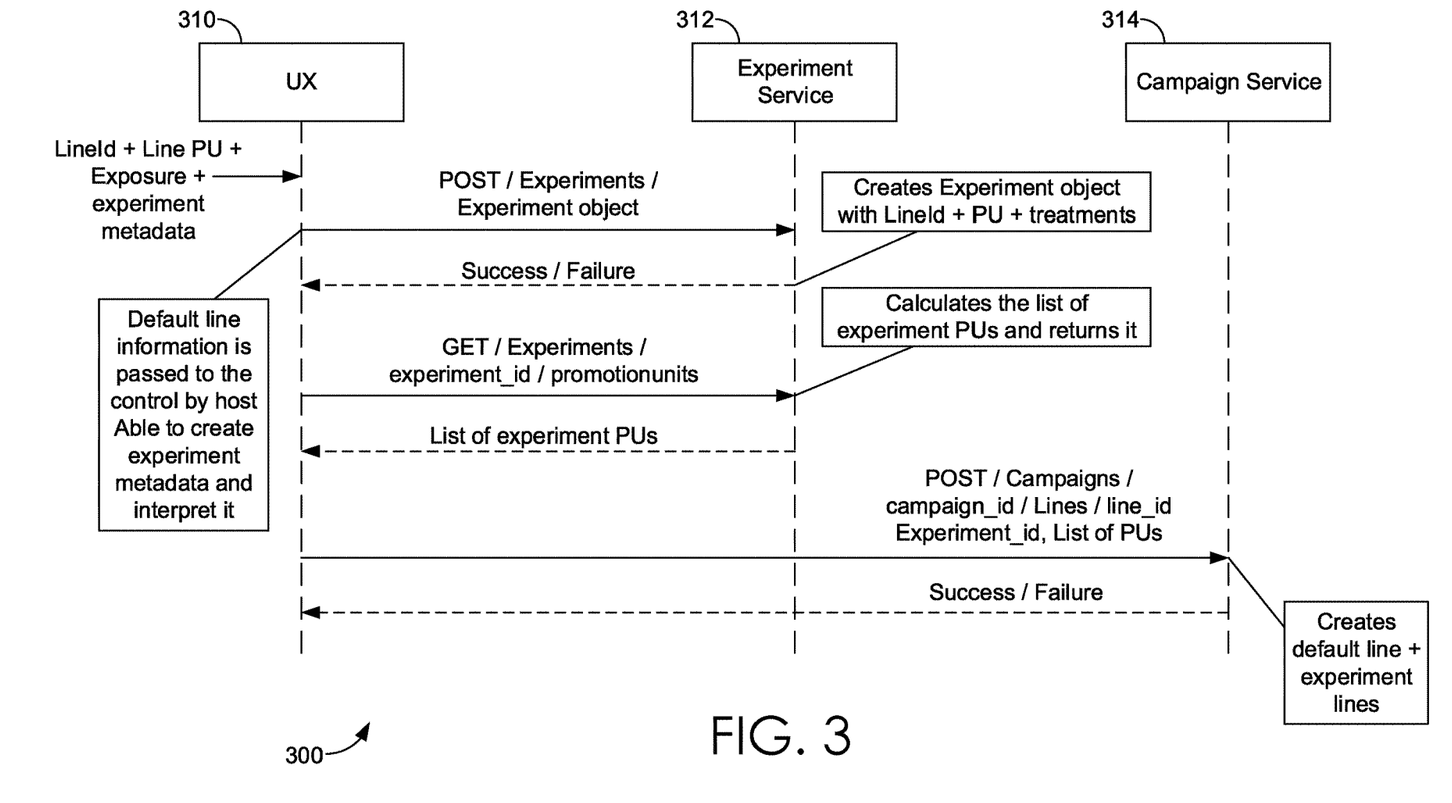
FIG. 3 is a flow diagram showing a method of creating an experiment, in accordance with aspects of the technology described herein.

Turning now to FIG. 3, a flow chart showing a method 300 of creating an experiment is shown, according to an aspect of the technology described herein. Method 300 may be performed by any computing device (such as computing device described with respect to FIG. 1) with access to a customer engagement platform experimentation framework (such as the one described with respect to FIG. 2) or by one or more components of the customer engagement platform experimentation framework (such as campaign portal 210, campaign service 220, or experiment service 222).

As illustrated, the user interface 310 enables a user to create an experiment with a numberline identification, promotional units, an exposure percentage, and other experiment metadata. All of this information is communicated to the experiment service 312 and the campaign service 314. If a new campaign is being created, default line information with a default control group size will be communicated to the experiment service 312.

The experiment service 312 creates the experiment in accordance with the information. If an experiment is based on an existing campaign, the experiment service 312 also communicates the experiments, experiment identifications, and promotional units to the user interface 310 for selections by the user.

The campaign service 314 creates the experiment bookings that are ultimately delivered to the user clients in accordance with the selections made by the user. Additionally, successes or failures of the experiment (based on interactions or click-through data) are communicated back from the campaign service 314 to the user interface 310 for manual or automatic editing of the experiment as described herein.

Figure 4:
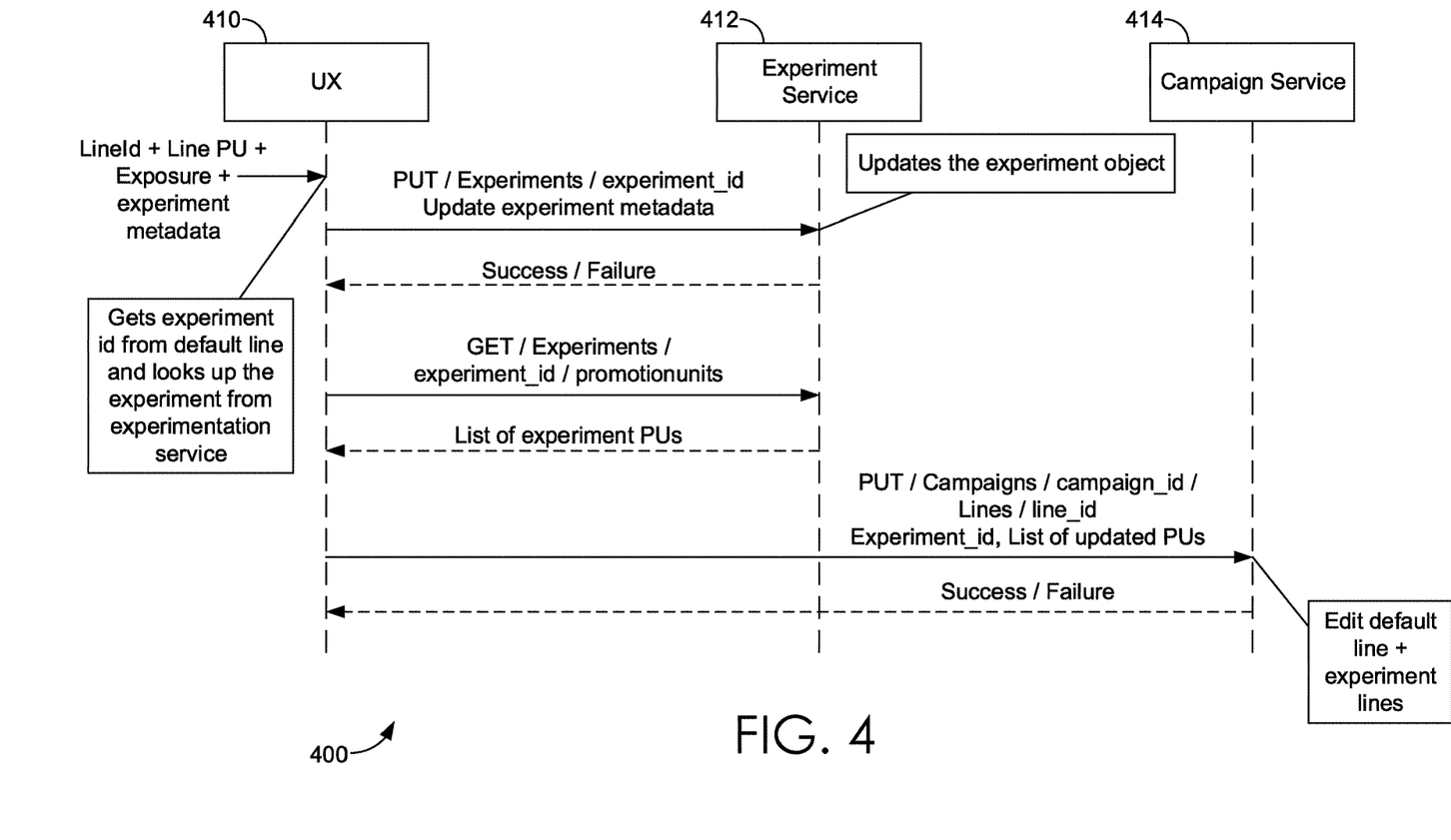
FIG. 4 is a flow diagram showing a method of editing an experiment, in accordance with aspects of the technology described herein.

Turning now to FIG. 4, a method 400 of editing an experiment is shown, according to an aspect of the technology described herein. Method 400 may be performed by any computing device (such as computing device described with respect to FIG. 1) with access to a customer engagement platform experimentation framework (such as the one described with respect to FIG. 2) or by one or more components of the customer engagement platform experimentation framework (such as campaign portal 210, campaign service 220, or experiment service 222).

As illustrated, the user interface 410 enables a user to edit an experiment. Initially, the numberline identification, promotional units, an exposure percentage, and other experiment metadata are retrieved from the experiment service 412. Additionally, or alternatively, the numberline identification, promotional units, an exposure percentage, and other experiment metadata may be utilized to look up and retrieve an experiment from the experiment service 412. Any updates to this information is communicated to the experiment service 412 and the campaign service 414 and the experiment is edited.

The experiment service 412 updates the experiment in accordance with the information. The campaign service 414 creates the experiment bookings that are ultimately delivered to the user clients in accordance with the selections made by the user. Additionally, successes or failures of the experiment (based on interactions or click-through data) are communicated back from the campaign service 414 to the user interface 410 for manual or automatic editing of the experiment as described herein.

Figure 5:
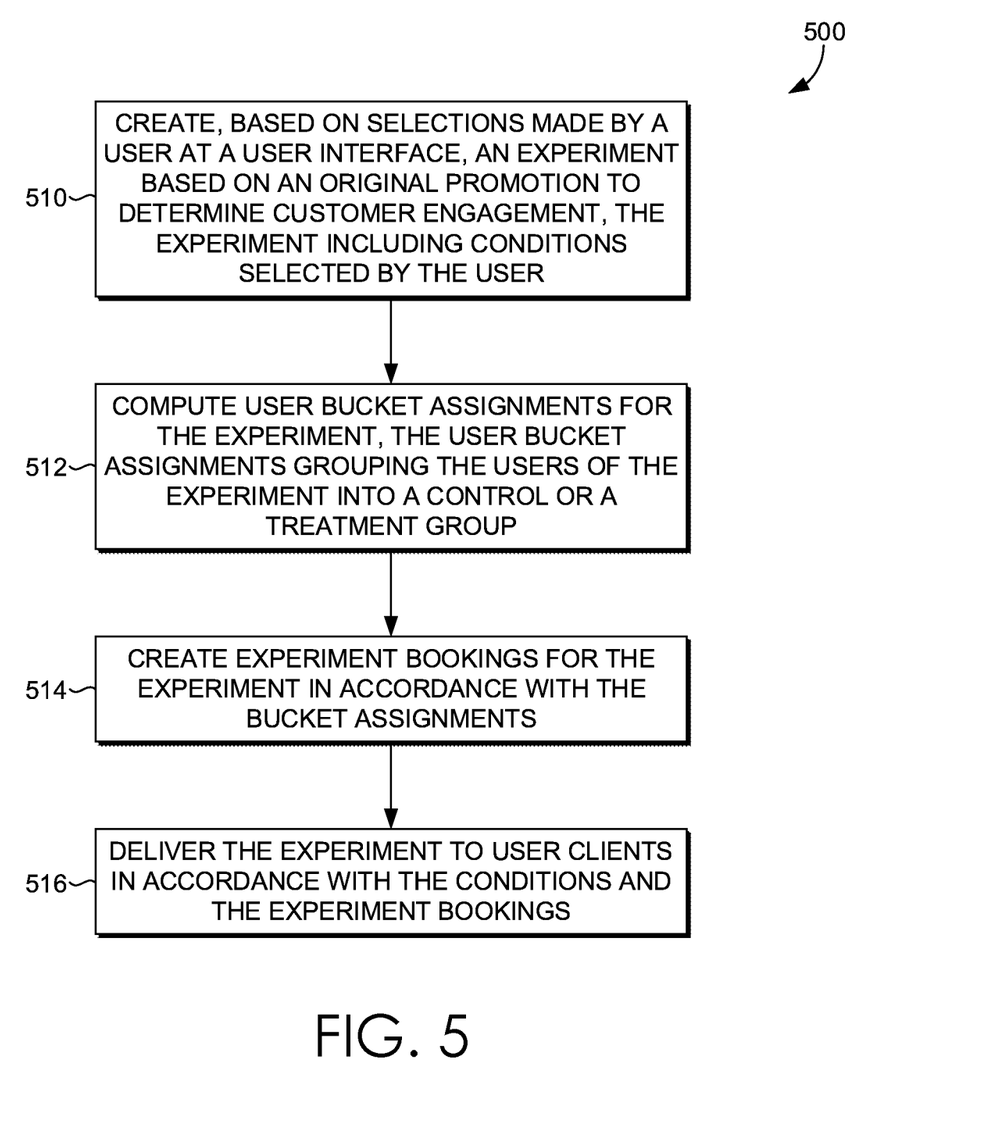
FIG. 5 is an exemplary flow diagram showing a method of delivering an experiment to user clients, in accordance with aspects of the technology described herein.

Turning now to FIG. 5, a flow chart showing a method 500 of delivering an experiment to user clients is shown, according to an aspect of the technology described herein. Method 500 may be performed by any computing device (such as computing device described with respect to FIG. 1) with access to a customer engagement platform experimentation framework (such as the one described with respect to FIG. 2) or by one or more components of the customer engagement platform experimentation framework (such as campaign portal 210, campaign service 220, or experiment service 222).

At step 510, based on selections made by a user at a user interface, an experiment is created to determine customer engagement. The experiment is based on an original promotion and includes conditions selected by the user.

User bucket assignments are computed, at step 512, for the experiment. The user bucket assignments group the users of the experiment into a control or a treatment group.

At step 514, experiment bookings are created for the experiment in accordance with the bucket assignments. The experiment is delivered, at step 516, to user clients in accordance with the conditions and the experiment bookings.

Figure 6:
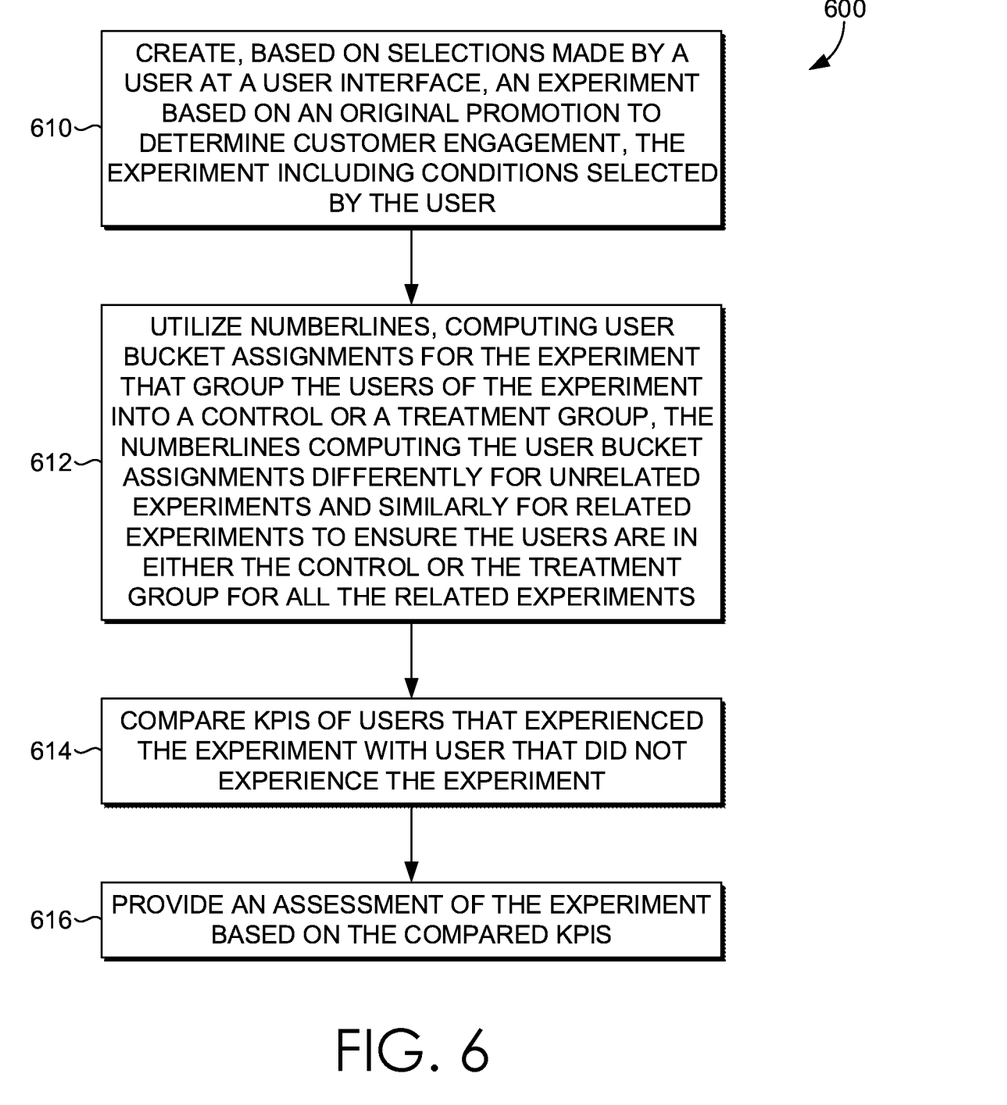
FIG. 6 is an exemplary flow diagram showing a method of assessing an experiment, in accordance with aspects of the technology described herein.

Turning now to FIG. 6, a method 600 of assessing an experiment is shown, according to an aspect of the technology described herein. Method 600 may be performed by any computing device (such as computing device described with respect to FIG. 1) with access to a customer engagement platform experimentation framework (such as the one described with respect to FIG. 2) or by one or more components of the customer engagement platform experimentation framework such as campaign portal 210, campaign service 220, or experiment service 222).

Initially, as illustrated at step 610, an experiment, based on an original promotion, is created. The experiment is based on selections made by a user at a user interface and includes conditions selected by the user.

At step 612, numberlines are utilized to compute user bucket assignments for the experiment that group the users of the experiment into a control or a treatment group. The numberlines compute the user bucket assignments differently for unrelated experiments and similarly for related experiments to ensure the users are in either the control or the treatment group for all the related experiments At step 614, KPIs of users that experienced the experiment are compared with KPIs of users that did not experience the experiment. Based on the compared KPIs, at step 616, an assessment of the experiment is provided.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method of creating a customer engagement platform experimentation framework, comprising:
   creating, based on selections made by a user at a user interface, an experiment based on an original promotion to determine customer engagement, the experiment including conditions selected by the user;
   computing user bucket assignments for the experiment, the user bucket assignments utilizing numberlines to compute the user bucket assignments and group users of the experiment into a control or a treatment group, the numberlines computing the user bucket assignments similarly for related experiments to ensure the users are in either the control or the treatment group for all the related experiments;
   creating experiment bookings for the experiment in accordance with the user bucket assignments;
   detecting parameters at runtime during a client content request, the parameters including operating system version or screen resolution; and
   upon the detected parameters being satisfied, delivering the experiment to the users in accordance with the conditions and the experiment bookings.

2. The method of claim 1, wherein the numberlines compute the user bucket assignments differently for unrelated experiments.

3. The method of claim 1, further comprising assigning different flight percentages for various segments within the treatment group in accordance with the conditions.

4. The method of claim 1, further comprising comparing key performance indicators (KPIs) of the users that experienced the experiment with users that did not experience the experiment.

5. The method of claim 4, further comprising providing an assessment of the experiment based on the compared KPIs.

6. The method of claim 1, further comprising implementing a control group by omitting a set of buckets of the users in accordance with a size of the control group in all experiments associated with a particular numberline.

7. The method of claim 1, wherein the experiment is revealed to a configurable percentage of users initially.

8. The method of claim 6, ramping up or down the experiment based upon an assessment of an effectiveness of the experiment.

9. The method of claim 1, wherein exactly one parameter within the original promotion can be varied.

10. The method of claim 8, wherein the experiment can test more than one value for this parameter.

11. The method of claim 9, wherein the treatment group includes an exposure percentage that determines a percentage of the users that will experience a particular variant value of the experiment.

12. A computer-readable storage media comprising computer-executable instructions, that when executed by a computer, causes the computer to perform operations to facilitate creating a customer engagement platform experimentation framework, the operations comprising:
   creating, based on selections made by a user at a user interface, an experiment based on an original promotion to determine customer engagement, the experiment including conditions selected by the user;
   utilizing numberlines, computing user bucket assignments for the experiment that group the users of the experiment into a control or a treatment group, the numberlines computing the user bucket assignments differently for unrelated experiments and similarly for related experiments to ensure the users are in either the control or the treatment group for all the related experiments;
   creating experiment bookings for the experiment in accordance with the user bucket assignments;
   detecting parameters at runtime during a client content request, the parameters including operating system version or screen resolution;
   upon the detected parameters being satisfied, delivering the experiment to the users in accordance with the conditions and the experiment bookings;
   comparing key performance indicators (KPIs) of users that experienced the experiment with KPIs of users that did not experience the experiment; and
   providing an assessment of the experiment based on the compared KPIs.

13. The media of claim 12, further comprising creating experiment bookings for the experiment in accordance with the bucket assignments.

14. The media of claim 13, further comprising delivering the experiment to user clients in accordance with the conditions and the experiment bookings.

15. The media of claim 12, wherein exactly one parameter within the original promotion can be varied.

16. The media of claim 15, wherein the experiment can test more than one value for this parameter.

17. The media of claim 16, wherein the treatment group includes an exposure percentage that determines the percentage of users that will experience a particular variant value of the experiment.

18. A computerized system:
- a processor; and
- a computer storage medium storing computer-useable instructions that, when used by the processor, cause the processor to:
- enable setup and management of experiments to determine customer engagement, the setup and management including conditions;
- store and manage the experiments and numberline metadata;
- compute user bucket assignments for each experiment of the experiments in accordance with the numberline metadata, wherein the numberline metadata is utilized to compute the user bucket assignments similarly for related experiments to ensure the users are in either the control or the treatment group for all the related experiments;
- create experiment bookings for each experiment of the experiments in accordance with the user bucket assignments;
- detect parameters at runtime during a client content request, the parameters including operating system version or screen resolution; and
- upon the detected parameters being satisfied, deliver the experiment to the users in accordance with the conditions and the experiment bookings.

* * * * *